(12) United States Patent
Angué et al.

(10) Patent No.: US 7,290,477 B2
(45) Date of Patent: Nov. 6, 2007

(54) LINEAR DRIVE

(75) Inventors: Eric Angué, Kornwestheim (DE); Simone Kopp, Esslingen (DE); Ulrich Diener, Esslingen (DE)

(73) Assignee: Festo AG & Co., Esslingen (DE)

( * ) Notice: Subject to any disclaimer, the term of this patent is extended or adjusted under 35 U.S.C. 154(b) by 296 days.

(21) Appl. No.: 11/054,038

(22) Filed: Feb. 9, 2005

(65) Prior Publication Data

US 2005/0188837 A1 Sep. 1, 2005

(30) Foreign Application Priority Data

Mar. 1, 2004 (DE) ................ 044 00 013

(51) Int. Cl.
*B23Q 1/58* (2006.01)
*B23Q 5/38* (2006.01)
*F15B 15/00* (2006.01)

(52) U.S. Cl. ................ 92/88; 92/59; 92/128

(58) Field of Classification Search ............ 92/59, 92/88, 128, 146, 161
See application file for complete search history.

(56) References Cited

U.S. PATENT DOCUMENTS

| | | | | |
|---|---|---|---|---|
| 4,516,476 A | * | 5/1985 | Beaton | ............ 92/128 |
| 5,351,603 A | * | 10/1994 | Yuda | ............ 92/128 |
| 5,363,741 A | * | 11/1994 | Takada et al. | ............ 92/146 |
| 5,511,461 A | * | 4/1996 | Miyachi et al. | ............ 92/13.5 |
| 5,724,880 A | * | 3/1998 | Noda | ............ 92/128 |
| 5,884,549 A | * | 3/1999 | Hosono et al. | ............ 92/146 |
| 6,145,404 A | * | 11/2000 | Maffeis et al. | ............ 92/128 |
| 6,345,568 B1 | * | 2/2002 | Wakasugi et al. | ............ 92/146 |

FOREIGN PATENT DOCUMENTS

EP 0 603 459 B2 6/1994

* cited by examiner

*Primary Examiner*—Thomas E. Lazo
(74) *Attorney, Agent, or Firm*—Hoffmann & Baron, LLP

(57) ABSTRACT

A linear drive has a drive housing and a carriage guide for relative motion in the direction of a principal axis. The carriage possesses a row of openings on it with several first carriage openings, whereas the drive housing has a row of openings on the housing side with mutually spaced first housing openings. Given suitable positioning of the carriage it is possible for attachment screws to be inserted right through the first carriage openings and inserted into the first housing openings. Second carriage openings belonging in addition to the row of openings on the carriage side are designed in the form of threaded openings, which render possible screwing in of attachment screws, that are inserted in the first housing openings of a further similar linear drive directly fitted to the carriage in a piggy-back fashion, through the first carriage openings thereof.

14 Claims, 9 Drawing Sheets

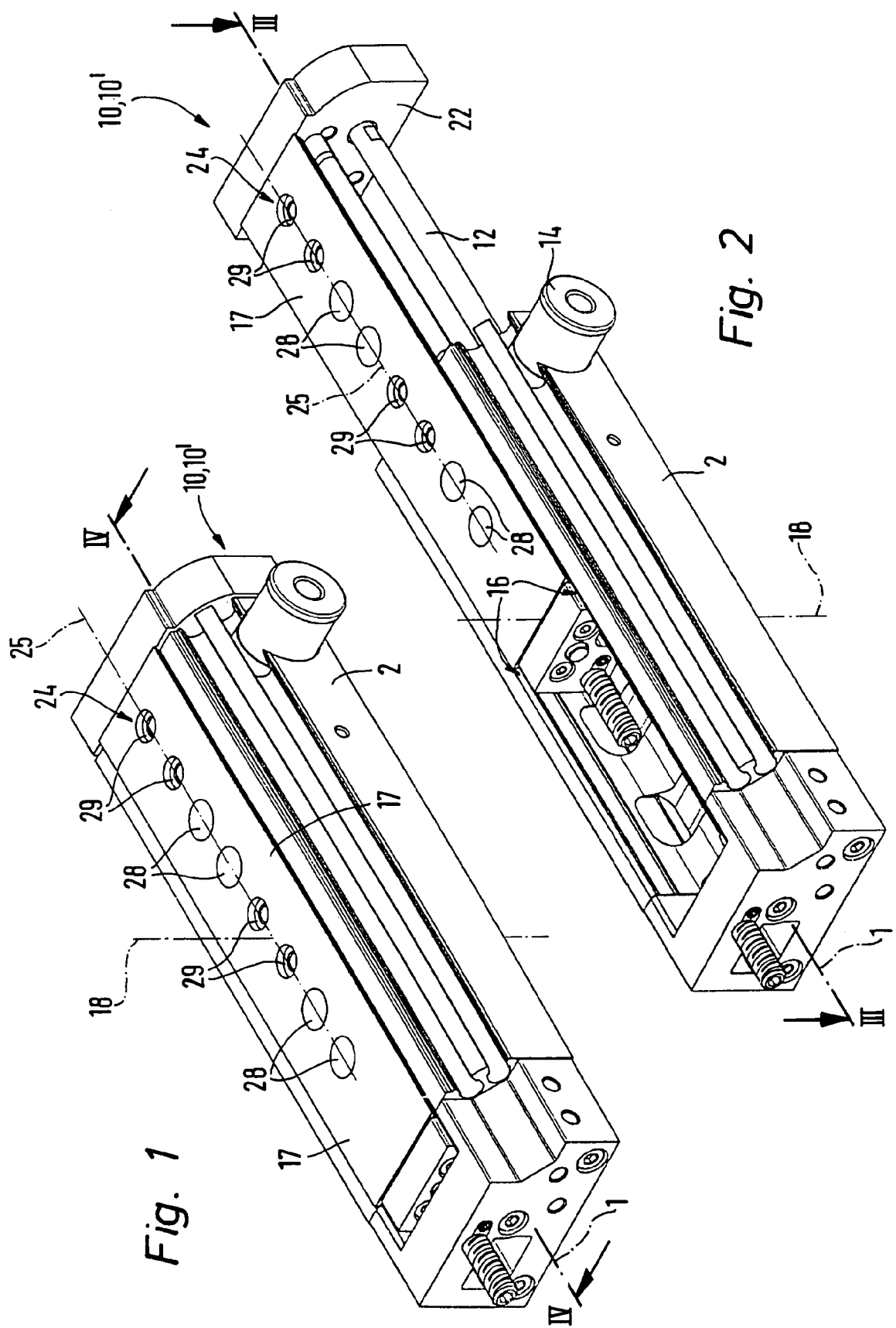

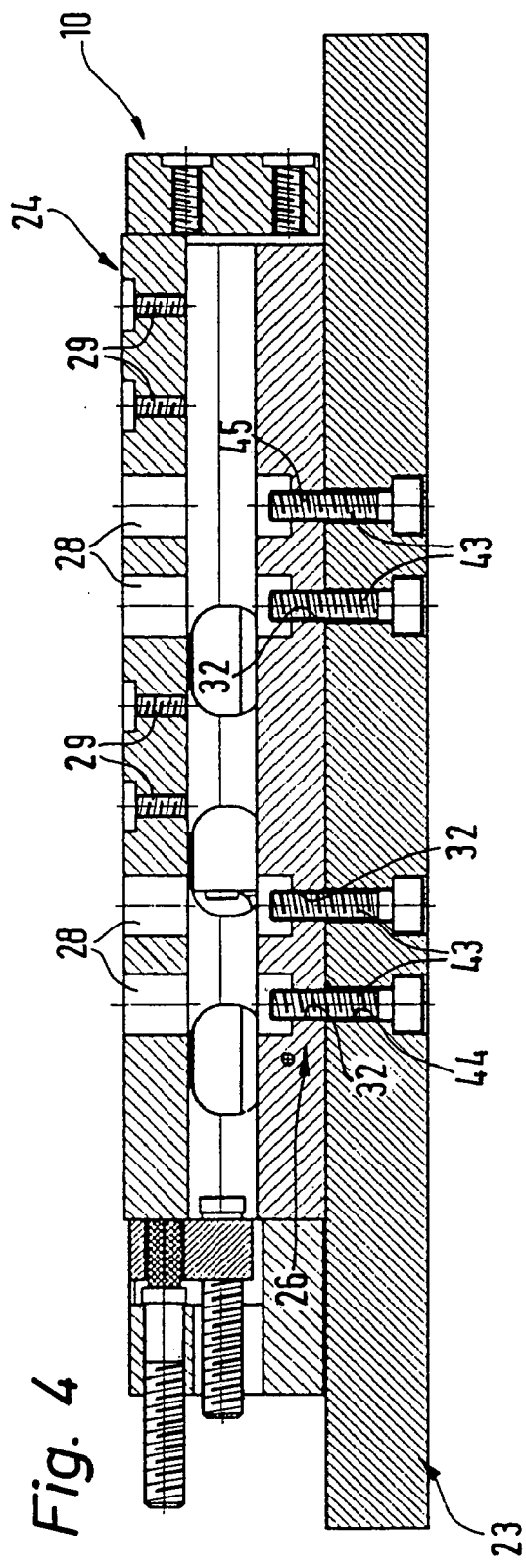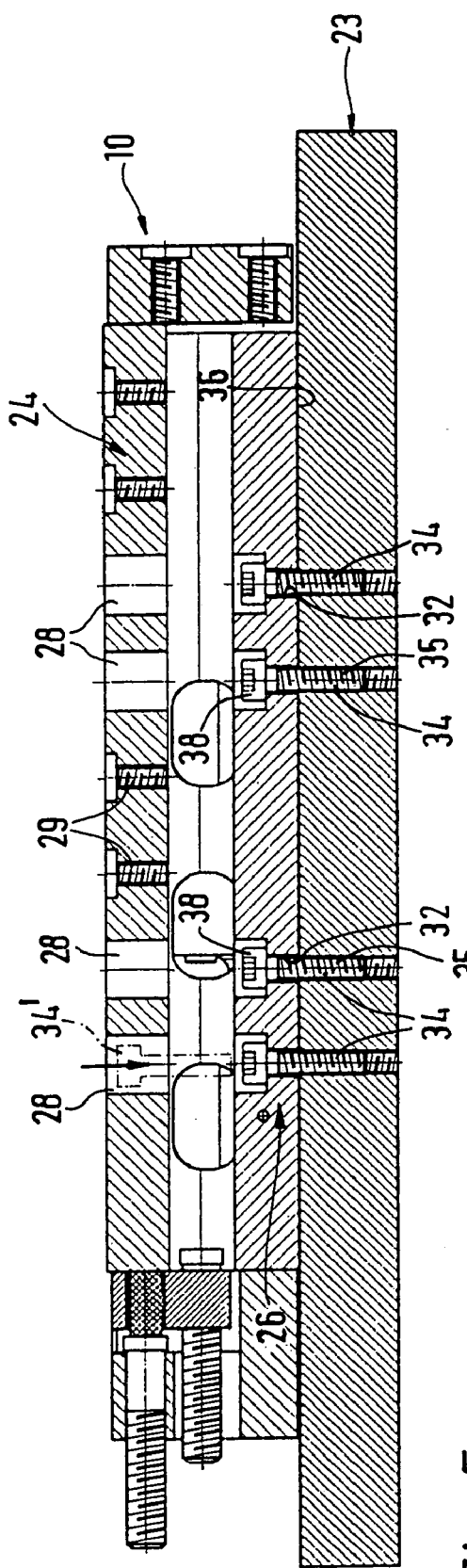
Fig. 4
Fig. 5

LINEAR DRIVE

BACKGROUND OF THE INVENTION

The invention relates to a linear drive comprising a drive housing and a carriage guided for movement in the direction of a principal axis, said carriage being arranged with at least a part of its length in the direction of an upright axis adjacent to the drive housing and having at least one linear row of openings on the carriage side with first carriage openings spaced apart in the direction of the principal axis, said drive housing having at least one linear row of openings on the housing side with first housing openings spaced from each other in the direction of the principal axis, such spaced first housing openings being able to be so brought, by suitable positioning of the carriage, into an assembly position flush in the direction of the upright axis with one respective carriage opening that attachment screws serving for the attachment of the linear drive may be completely inserted through the first carriage openings and insert inserted into the first housing openings.

THE PRIOR ART

A linear drive of this type disclosed in the European patent publication 0 603 549 B2 comprises a drive housing having several housing openings extending through it in the form of threaded holes and having a carriage sliding on it, such carriage having threadless first carriage openings. In both cases the openings are aligned with a principal axis extending in the stroke direction of the carriage and may be moved by suitable positioning of the carriage into an assembly position flush with the direction of the upright axis. If the linear drive is to be mounted on a base there is the theoretical possibility of using attachment screws, whose shanks are smaller in diameter than the first housing openings so that they may be respectively inserted through the first housing openings from the carriage side completely and then without thread engagement inserted through the first housing openings. The base then has threaded holes adapted to the attachment screw so that the drive housing may be screwed up tight. Alternatively there is also the possibility of securing the drive housing in such a manner on a base that the attachment screws are inserted from the side of the base through same and screwed into the first housing openings. In this case it is necessary however to use attachment screws with a correspondingly larger thread diameter.

If two linear drives are to be secured on each other in a piggy-back manner with the drive housing of the one linear drive fixed on the carriage of the other linear drive, then recourse is had to an adapter plate not described in the prior art in detail. The plate may be secured using additional threaded holes in the carriage part, which are arranged outside the row of openings on the carriage side (see FIG. 6 of the European patent publication 0 603 459 B2), the adapter plate then again having to have a threaded hole pattern adapted to the distribution of the first housing openings of the drive housing to be mounted.

All this involves a relatively large amount of complexity, either for the designer or as regards the functionally correct installation of one or more linear drives.

SHORT SUMMARY OF THE INVENTION

One object of the present invention is to create a linear drive which offers adaptable and simple possibilities of assembly.

In order to achieve these and/or other objects appearing from the present specification, claims and drawings, in the present invention the row of openings in the carriage comprises, in addition to the first carriage openings, second carriage openings in the form of threaded holes, which render possible the screwing in of attachment screws, which are inserted into the first housing openings of a further similar linear drive mounted with its drive housing to the fore in a piggy-back fashion directly on the carriage through its first carriage openings.

Accordingly on the carriage there is one row of openings, in which, in a linear aligned row in the direction of the principal axis there are not only the first carriage openings provided for the complete insertion of attachment screws right through but also second carriage openings permitting the fitting of attachment screws. This means that there is more especially the possibility of securing two similar linear drives together in a piggy-back manner by direct screwing of the drive housing of the one linear drive on the carriage of the other linear drive doing without the adapter plate so far normally employed. Such an attachment screw inserted through a first housing opening in the drive housing may be directly screwed into one of the second carriage openings, in the form of threaded holes, in the adjacent carriage.

Nevertheless there is the possibility of still employing the first housing openings for attaching the linear drive to some other base, for example on a mounting plate belonging to a machine.

Further advantageous developments of the invention are defined in the claims.

Since the first carriage openings only serve the purpose of rendering possible the complete insertion of attachment screws, they may be without any screw thread at all.

In order to produce strong connections it is to be recommended to arranged the first and the second carriage openings alternatingly in groups in sequence so that in the case of the attachment of respectively several second carriage openings one or more opening groups may be employed. It is more especially preferable to have a paired alternating sequence of first and second carriage openings.

Having at least two first carriage openings on a relatively short length section of the row of openings on the housing side does more particularly offer advantages, if there is to be a possibility of attaching the linear drive with a perpendicular alignment at the end to the head piece of the carriage of another linear drive in order to produce a dual axis x-y movement system.

In the case of an advantageous design of the linear drive the first housing openings are in the form of threaded holes, whose thread diameter is at least so large that the shank of an attachment screw (whose thread diameter is equal to that of the second carriage openings) may be inserted without thread engagement. If a linear drive is to be fixed from the carriage side to a base—for example an attachment plate or the carriage of a further linear drive—it is accordingly possible to use attachment screws, whose shanks may be inserted through the first housing openings in order to screw same into a thread in the base side. If on the other hand an attachment is desired from the base side, recourse is had to attachment screws, whose thread diameter is equal to that of the first housing openings so that same may be screwed from the side opposite to the carriage into the first housing openings.

While in the case of this design to realize different forms of assembly it is necessary to use attachment screws with two different thread sizes, in the case of a preferred, further development of the invention all assembly tasks may be accomplished using attachment screws with the same thread size. For this purpose second housing openings are provided within the row of openings on the housing side in addition to the further housing openings, said second housing openings being in the form of threaded holes and their thread diameter being equal to that of the second carriage openings. Simultaneously the diameter of the first housing openings is made so large that the threaded shank of an attachment screw, whose thread diameter is the same as that of the second housing openings, may be readily be inserted right the way through. The first housing openings may in this case be readily be without threads.

In order in this case to screw a linear drive from the side of a base to such base it is possible to use attachment screws which are inserted from the rear side through the base and screwed into the second housing openings. The same attachment screws may however also be utilized for screw attachment from the carriage side, since in this case the thread shanks may be readily introduced through the correspondingly larger first housing openings. For the piggy-back design these screw shanks inserted through the first housing openings may readily be screwed into the second carriage openings, whose thread diameter is the same as that of the shank of the attachment screws.

In order to secure a linear drive with an exact alignment on a base preferably both the second carriage openings and also the first housing openings and possibly the second housing openings, are provided with a concentric centering widening part, adjacent to their outer end sides, into which a centering sleeve may be inserted, which then in the applied condition of for example two linear drives simultaneously fits into the centering widening parts of mutually aligned openings and accordingly accurately centers the drive component.

The linear drive fitted with the assembly system may be produced both for fluid power and also electrical systems.

Further advantageous developments and convenient forms of the invention will be understood from the following detailed descriptive disclosure of embodiments thereof in conjunction with the accompanying drawings.

LIST OF THE SEVERAL VIEWS OF THE FIGURES

FIG. 1 shows a preferred design of the linear drive in accordance with the invention in a perspective rear view with the carriage retracted.

FIG. 2 shows the linear drive of FIG. 1 with the carriage in the extended position.

FIGS. 4 and 5 show the conditions of the drive mounted on a base in different manner in a longitudinal section taken on the section line IV-IV of FIG. 1.

DETAILED ACCOUNT OF WORKING EMBODIMENTS OF THE INVENTION

Figure 3:
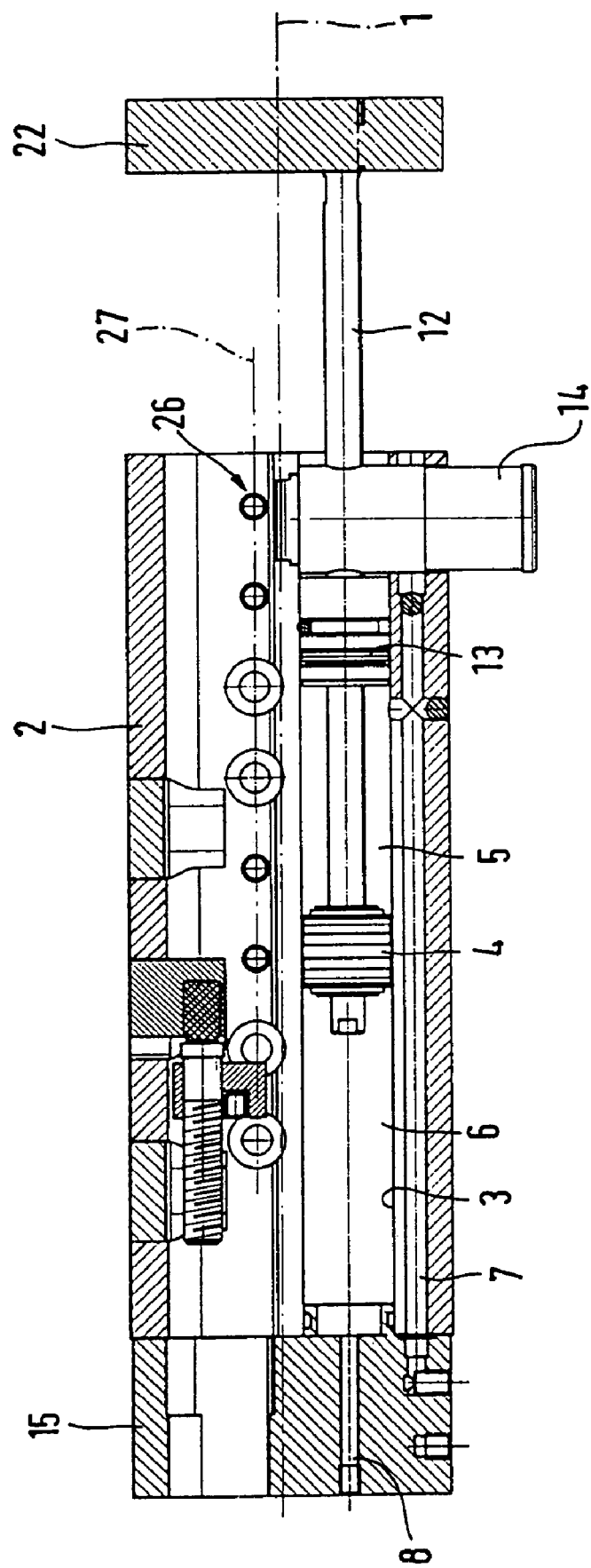
FIG. 3 shows a longitudinal section taken through the linear drive with the extended carriage position illustrated in FIG. 2 and on the section line III-III of FIG. 2.

As is more especially apparent from FIGS. 1 through 3 the linear drives of the working example possess an elongated configuration with a principal axis 1 following the extent of the longitudinal axis. As a base of the linear drive a drive housing 2 is provided, which in the interior defines a longitudinally extending drive space 3, in which drive means 4 are located able to be driven in a linear movement. The drive means 4 comprise in the working embodiment a piston, which in a sealing manner divides the drive space 3 axially into two working chambers 5 and 6, which respectively communicate with a fluid duct 7 and 8 extending in the wall of the drive housing 2, such fluid duct opening at the outer face. By the controlled supply and removal of a fluid pressure medium, such as compressed air, into and respectively, from the working chambers 5 and 6 the piston 4 may be driven in a linear movement in relation to the drive housing 2, such movement being transmitted to the outside by way of a piston rod 12 engaging the piston 4.

In a sealing manner the piston rod 12 extends through front terminal wall 13 terminating the drive space 3 at one end, such terminal wall 13 being preferably inserted like a plug into the drive space 3 and pinned to the drive housing 2.

Axially externally and adjoining the front terminal wall 13 a clamping unit 14 may be provided inserted like a cartridge in a recess in the drive housing 2, such unit 14 also having the piston rod 12 extending through it and being able to be activated by fluid force in order to arrest the piston rod 12 at any desired position in relation to the housing. The rear termination of the drive space 3 in the working example constitutes a terminal cover 15 arranged to the rear on the drive housing 2.

Externally on the drive housing 2 a carriage 17 is guided for sliding movement in the direction of the principal axis 1 thanks to the provision of a linear guide means 16 made up of more particularly two guide units. This carriage 17 lies in the direction of an upright axis 18 perpendicular to the principal axis 1 alongside the drive housing 2, which in accordance with its current position it overlaps for a larger or smaller part of its axial length. In the retracted position depicted in FIG. 1 the carriage has practically its entire length alongside and adjacent to the drive housing 2. In the extended position comparable with FIGS. 2 and 3 it has its front end section extending past the front end face of the drive housing 2.

The linear movement of the carriage 17 is caused by the drive means 4, which are coupled drivingly with the carriage 17 by way of the piston rod 12. In the working embodiment the carriage 17 has, adjacent to front end portion, a connecting yoke 22, extending past the drive housing 2, to which the piston rod 12 is secured at its outer end section.

A load to be moved, as for instance a machine component, a gripper or even another linear drive, can be fixed to the carriage 17, if several linear drives are to be joined together as a subassembly.

The linear drive may if necessary be designed without a piston rod, as for example like a so-called slotted cylinder, in the case of which the drive force is transmitted between the drive means 4 and the carriage 17 by means of an entraining means which extends through a slot opening into the drive space 3. Furthermore, a contact-free magnetic coupling between the drive means 4 and the carriage 17 would be possible. Moreover, the drive means 4 could be a part of an electrical drive component, as for instance of an electrodynamic linear direct drive or of an electrically operated lead screw drive.

The linear drive is provided with means rendering possible screw attachment both of the drive housing 2 and also of the carriage 17 to another component. This is depicted by way of example in FIGS. 4 and 5 and furthermore 9 and 10 in each case with a linear drive 10 attached to a base in the form of an attachment plate or board 23, the basic design of the linear drive being the same as that shown in FIGS. 1 through 3. FIGS. 6 through 8 and 11 through 13 show further possible assembly combinations, in the case of which a further linear drive 10' is for its part mounted on a linear drive 10 mounted in turn on a mounting plate 23.

The following account applies representatively for all illustrated linear drives 10 and 10' to the extent that in individual cases no different measures are adopted.

A linear row of openings is provided on the carriage 17, which will be termed the carriage side row 24 of openings. Their row direction 25 indicated in chained lines in FIGS. 1 and 2 extends in parallelism to the principal axis 1.

In the direction of the upright axis 18 and opposite to the carriage side row 24 of openings there is a row 26 termed the housing side row of openings, the row direction 27 also indicated in chained lines of the housing side row 26 of openings extending in parallelism to the principal axis 1 as well.

The carriage side row 24 of openings comprises sequentially placed spaced apart first carriage openings 28 and second carriage openings 29. The latter are preferably arranged in groups in an alternating fashion, the openings preferably being collected together in pairs so that as illustrated in the row direction 25 in alternating succession two sequentially placed first and second carriage openings 28 and 29 are provided.

The first carriage openings 28 do not have any attachment function and may consequently be devoid of screw threads. The second carriage openings 29 on the other hand are in the form of threaded holes and have a female screw threads rendering possible the insertion of attachment screws.

The row 26 of openings on the housing side has a plurality of first housing openings 32 spaced out in the row direction in sequence. Such openings, like the carriage openings 28 and 29, are aligned in the direction of the upright axis 18. Since furthermore the two rows 24 and 26 of openings are flush with the upright axis 18, it is possible to shift the carriage 17 so as to bring the first carriage openings 28 into an assembly position flush in the direction of the upright axis 17 with a respective one first carriage opening 28. In other words the longitudinal axes of the openings of the carriage 17 and of the drive housing 2 are aligned and such openings are coaxial.

Preferably the openings are so arranged that there is at least one carriage position, in which all first carriage openings 28 are flush with a respective first housing opening 32. In the working embodiments this is the completely retracted position of the carriage 17, which is depicted in FIG. 1 and furthermore FIGS. 4 through 13.

While in the case of the working example of FIGS. 4 through 8 the row 26 of openings comprises exclusively first housing openings 32, the row 26 of openings in the working embodiments of FIGS. 9 through 13 also comprises second housing openings 33. Comparable with the first and second housing openings with the first and second housing openings 32 and 33 as well there is a grouped and more especially paired alternating arrangement in the row 27 direction. An arrangement is more particularly preferred, in which the first carriage openings 28 are flush with the first housing openings 32 and the second housing openings 33 are respectively on a common line extending in the direction of the upright axis 18.

In the case of the working example in accordance with FIGS. 4 through 8 the first housing openings 32 are in the form of threaded holes, whose diameter is so large that the shank 35 of a first attachment screw 34 may be inserted without threaded engagement, the threaded diameter of such shank 35 being the same as that of the second carriage openings 29. The thread size of the shank 35 is consequently identical to that of the second carriage openings 29 and in the working example is the thread size M 2.5. The thread diameter of the first housing openings 32 is in the working example M 3 so that, as noted, the thread shank 35 may be inserted without screw engagement.

In order to secure a linear drive 10 from the carriage side to a mounting plate 23 the linear drive 10 with the bottom side, opposite to the carriage 17, first is placed on an attachment plate 23, which has threaded 37 holes flush with the first housing openings 32, whose thread diameter is the same as that of the shank 35 and accordingly as that of the second carriage openings 29. For attachment the linear drive 10 is so positioned on the attachment plate 23 that the first housing openings 32 are flush with the threaded holes 37 in the plate, following which the desired number of first attachment screws 34 is inserted through the first carriage openings 28 located in the assembly position with the shanks 35 to the fore and held in the first housing opening 32. The shank 35 then extending through the first housing openings 32 is then screwed into the threaded holes 37 in the plate. Since the head 38 of the first attachment screws 34 bears against the top side (facing the carriage 17) of the drive housing 2, it is accordingly possible for the drive housing 2 to be firmly braced against the attachment plate 23.

It will be clear that in this connection the diameter of the first carriage openings 28 must be at least so large that the head 38 of the first attachment screw 34 fits through it. The operation of insertion of an attachment screw 34 through a first carriage openings 28 is indicated in chained lines in FIG. 5 at 34'.

In a comparable manner it is possible for two linear drives in accordance with the invention to be joined together in a piggy-back fashion in order to have a linear drive subassembly. As an example of this FIGS. 6 and 7 show the fitting of a linear drive 10' to the carriage of the linear drive 10 secured to the attachment plate 23.

In this case the one linear drive 10' is so placed, with the bottom side of its drive housing to the fore, on the top side 42 of the carriage 17 of the other linear drive 10 arranged on the attachment plate 23 that the first housing openings 32 of its linear drive 2 are flush or aligned with the second carriage openings 29 of the carriage 17 of the other linear drive 10. In their function the second carriage openings 29 correspond to the function of the threaded holes 37 in the plate, the first attachment screws 34 being inserted through the first carriage openings 28 located in the assembly position and then being screwed by way of housing openings 32 in the second carriage openings 29 of the other linear drive 10.

Theoretically more than two linear drives could in this fashion be fitted together with a mutual parallel alignment in the longitudinal direction.

Figure 6:
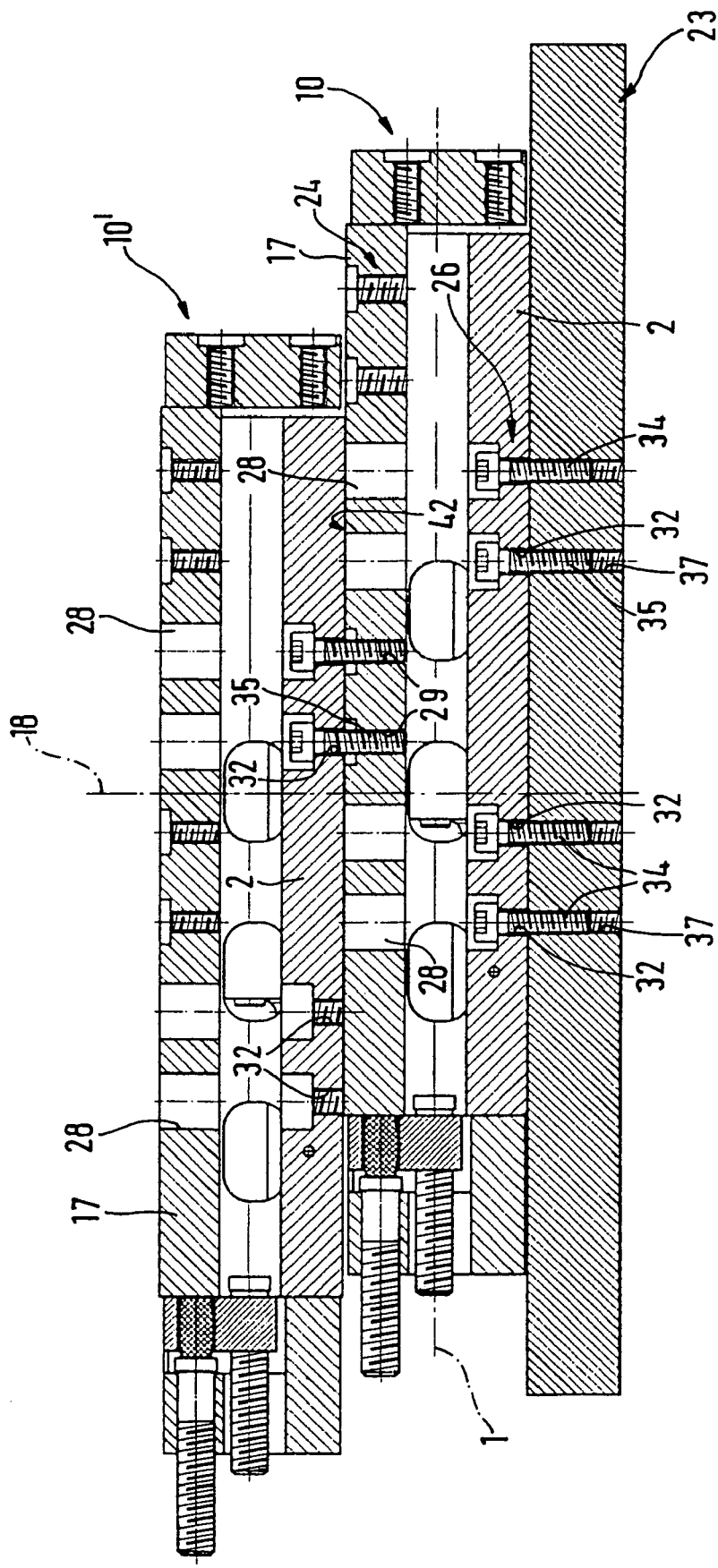
FIGS. 6 through 8 show different subassemblies, obtained by fitting together of several linear drives in a longitudinal section similar to the section on the section line IV-IV of FIG. 1.
Figure 7:
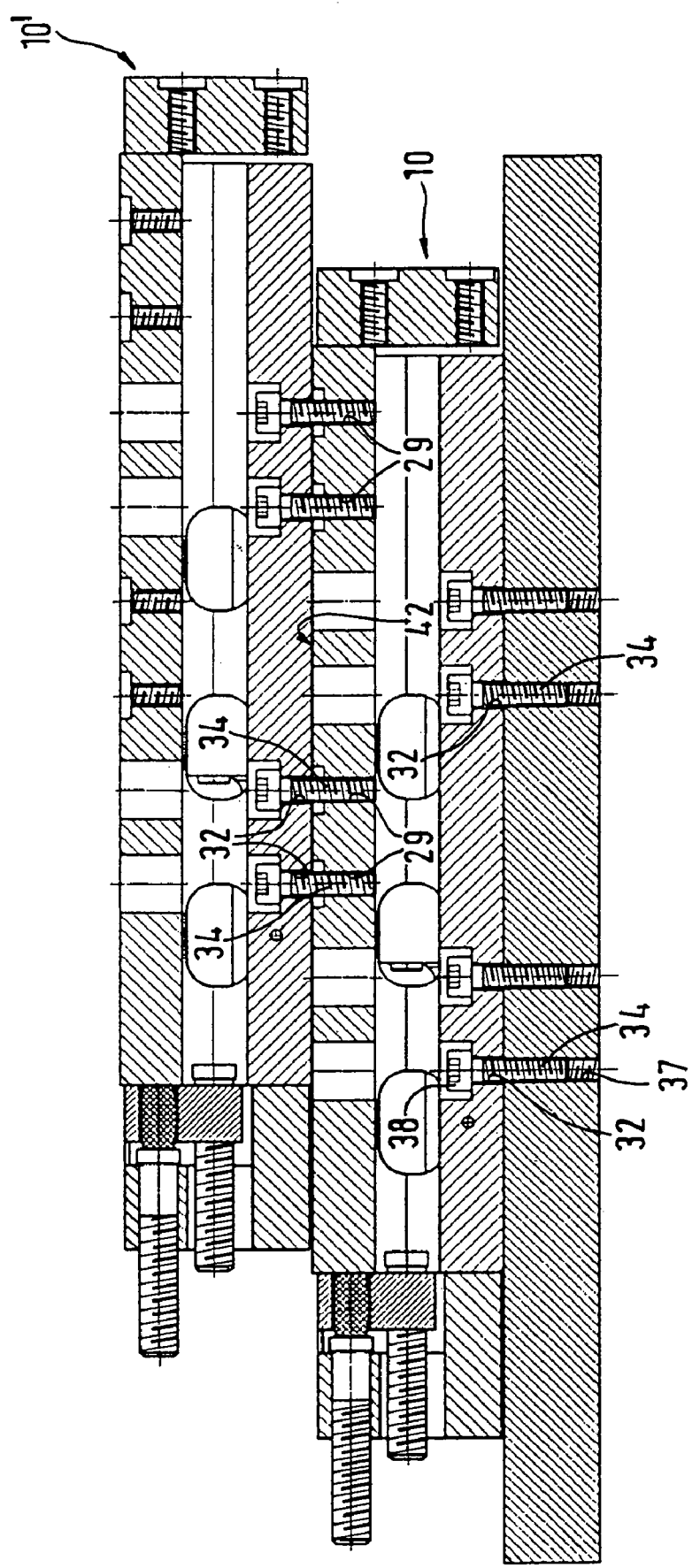
Figure 8:
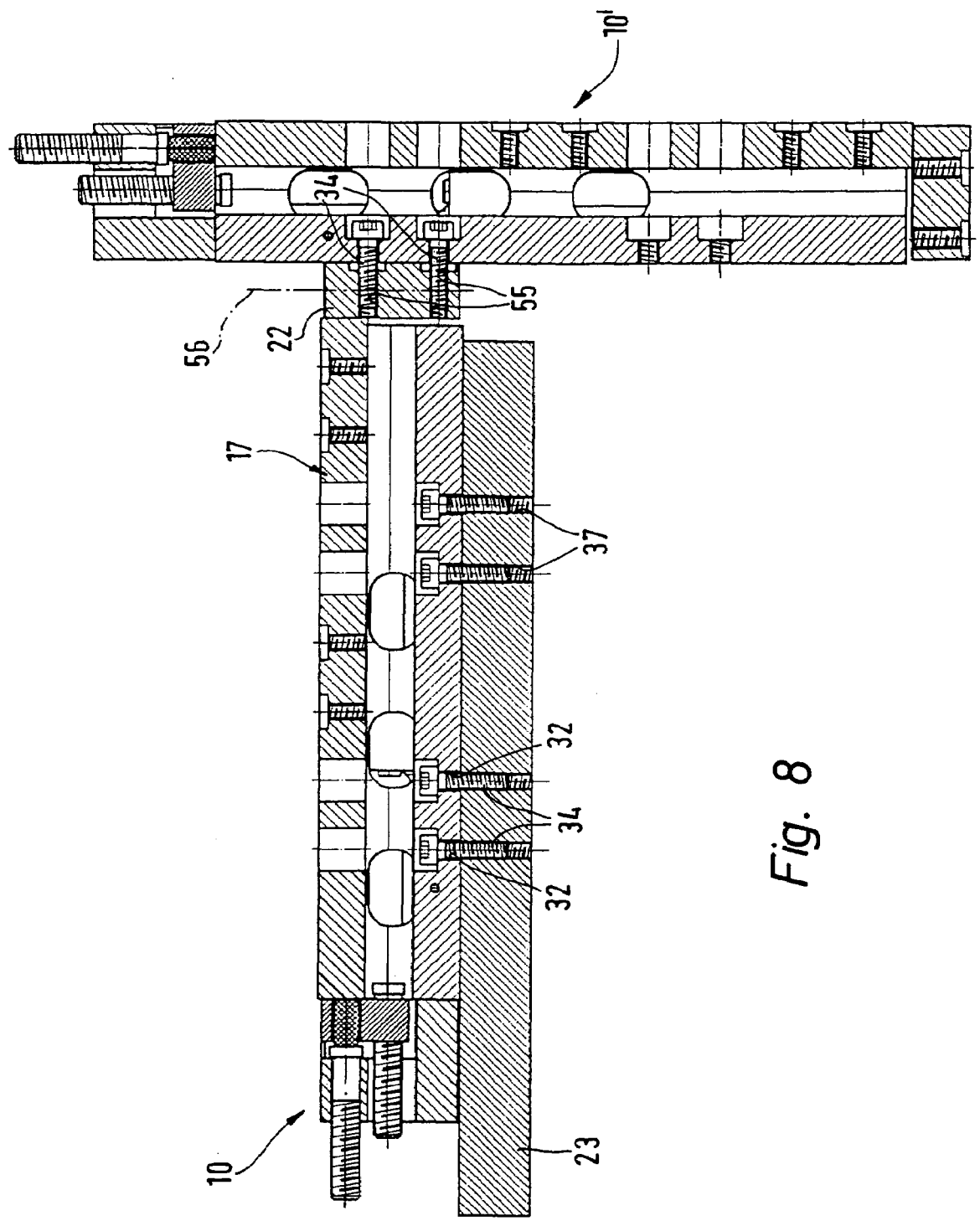

A comparison of FIGS. 6 and 7 will make it clear that if desired two linear drives 10 and 10' may be fixed together with a different relative axial position. The variability is because the drive housing 2 has several axially spaced out groups of first housing openings 32 and like the carriage 17 as well has several axially spaced groups of second carriage openings 29, which are able to be aligned selectively in relation to one another so that in the mounted state there is a different axial offset between the linear drives 10 and 10' which are secured together.

As is apparent there is the possibility of joining together several linear drives 10 and 10' piggy-back to constitute a subassembly by fitting them directly together without an intermediately placed adapter plate. In this case it is also convenient for only one row 24 and 26 of openings to be provided in the drive housing 2, such rows of openings being able to be respectively arranged in the middle of the width of the drive housing 2 and/or in the carriage 17.

As shown in FIG. 4 a linear drive 10 may be alternatively screwed to an attachment plate 23, in the case of which second attachment screws 43 are inserted from the bottom side opposite to the linear drive 10 of the attachment plate 23 right through same. In this case a first attachment plate 23 is employed which has openings 44 on the plate side, which may be unthreaded and in any case render possible the insertion of the shank 45 without threaded engagement, of the second attachment screws 43, the thread diameter of such shank 45 corresponding to that of the first housing openings 32. If the latter are aligned to be flush with the openings 44 on the plate side, the second attachment screws 43 may be inserted from the side opposite to the linear drive 10 through the attachment plate 23 and screwed into the first housing openings 32. In accordance with the thread specification applying for the working example's first housing openings 32 second attachment screw 43 are employed in the example, whose thread also complies with the M 3 thread specification.

While in the case of the embodiment of FIGS. 4 through 8 for the type assembly of the attachment plate 23 it is necessary to use first and second attachment screws 34 and 43 with different thread diameters, the design of FIGS. 9 through 13 renders possible relatively more adaptable attachment plate assembly using attachment screws with an identical screw thread specification—to the extent that the thickness of the attachment plate permits this—or even completely identical attachment screws. For a better distinction attachment screws with the same thread diameter will be termed third attachment screws 46. As regards details in the case of this advantageous embodiment the above mentioned second housing openings 33 are in the form of threaded holes, whose thread diameter is the same as that of the second carriage openings 29. The diameter of the first housing openings 32 is accordingly larger and at least so large that the thread shank 45 of the third attachment screw 46, whose thread diameter corresponds to that of the second housing opening 33, may be inserted right the way through without threaded engagement. Since the first housing openings 32 in this working example are only to permit the insertion of the third attachment screws 46, they may, as illustrated, be unthreaded.

The fitting of a linear drive 10 to an attachment plate may, in a manner similar 10 to FIGS. 4 through 8, again selectively so take place that the third attachment screws 46 are either inserted through the carriage 17 or are inserted from the bottom side, opposite to the linear drive 10, of the attachment plate 23. The first method takes place in accordance with FIGS. 10 through 13 in the same manner as with FIGS. 5 through 8, the third attachment screws 46 extending through the unthreaded first housing openings 32 and having their shanks 45 screwed into the openings 47 in the plate, such openings having the same thread diameter as the thread shanks 45. The screw heads 48 in this case bear against the top side 42, facing the carriage 17 in the direction of the axis 18, of the drive housing 2, the first housing openings 32 possibly also having—like the working example of FIGS. 4 through 8—a widened terminal section 52, which receives the associated screw head 48.

Figure 9:
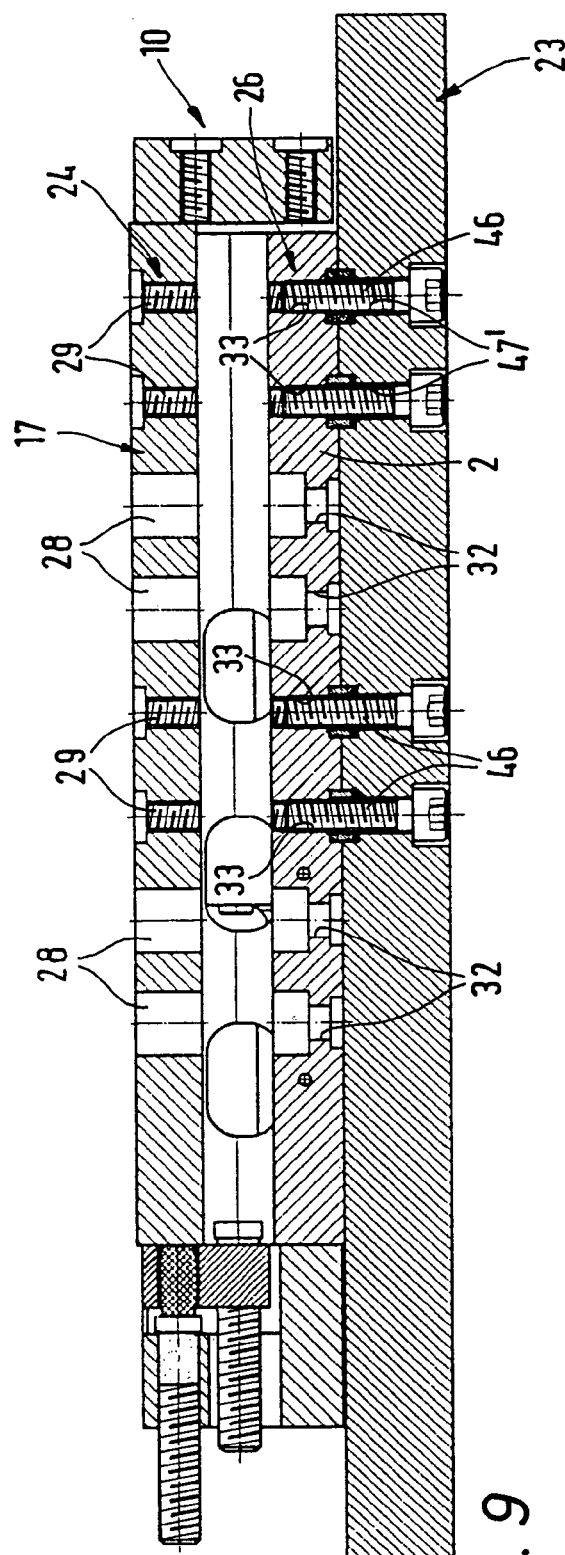
FIGS. 9 and 10 show different forms of assembly of a linear drive, whose structure is the same as that of FIGS. 1 through 3 apart from a departure in the design of the drive housing.
Figure 10:
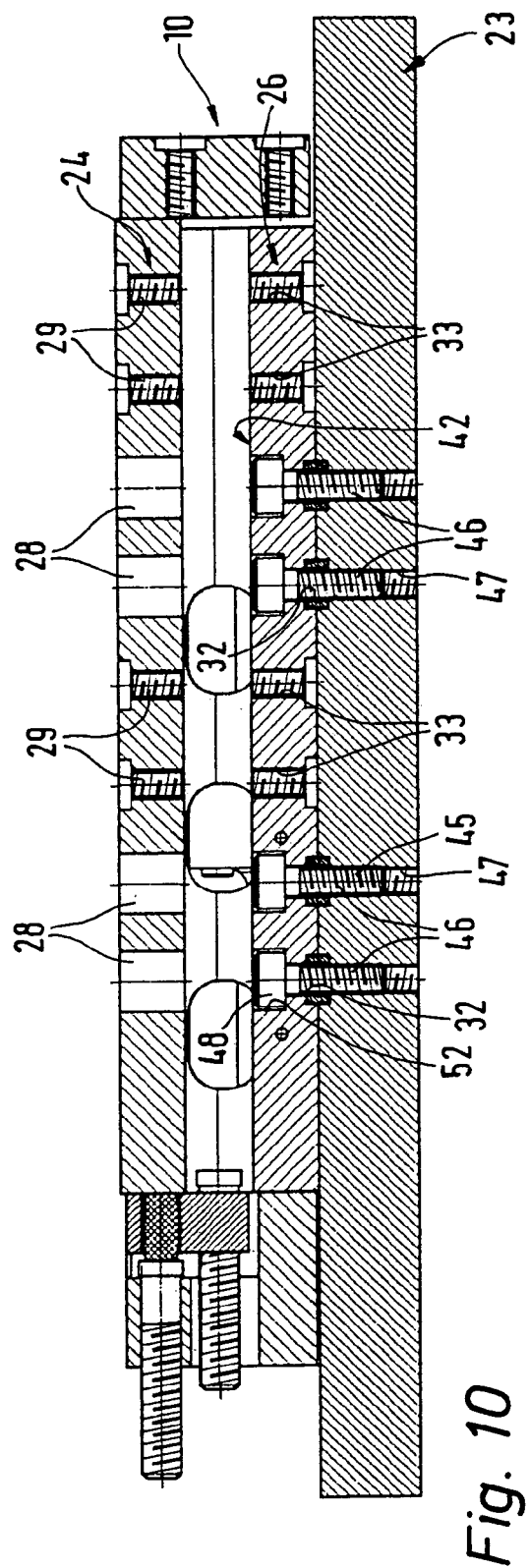

In order to be able to secure a linear drive 10 in accordance with FIG. 9 from the attachment plate (23) side, the attachment plate 23 has plate side openings 47', whose diameter is larger than the thread diameter of the thread shank 45 of the third attachment screw 46 so that the latter may be inserted, with its thread shank 45 to the fore without threaded engagement, and may be screwed into a flush second housing opening 33.

Since for the two types of attachment first and second housing openings 32 and 33 are provided, in both cases third attachment screws 46 may be utilized with the same thread diameter.

Figure 11:
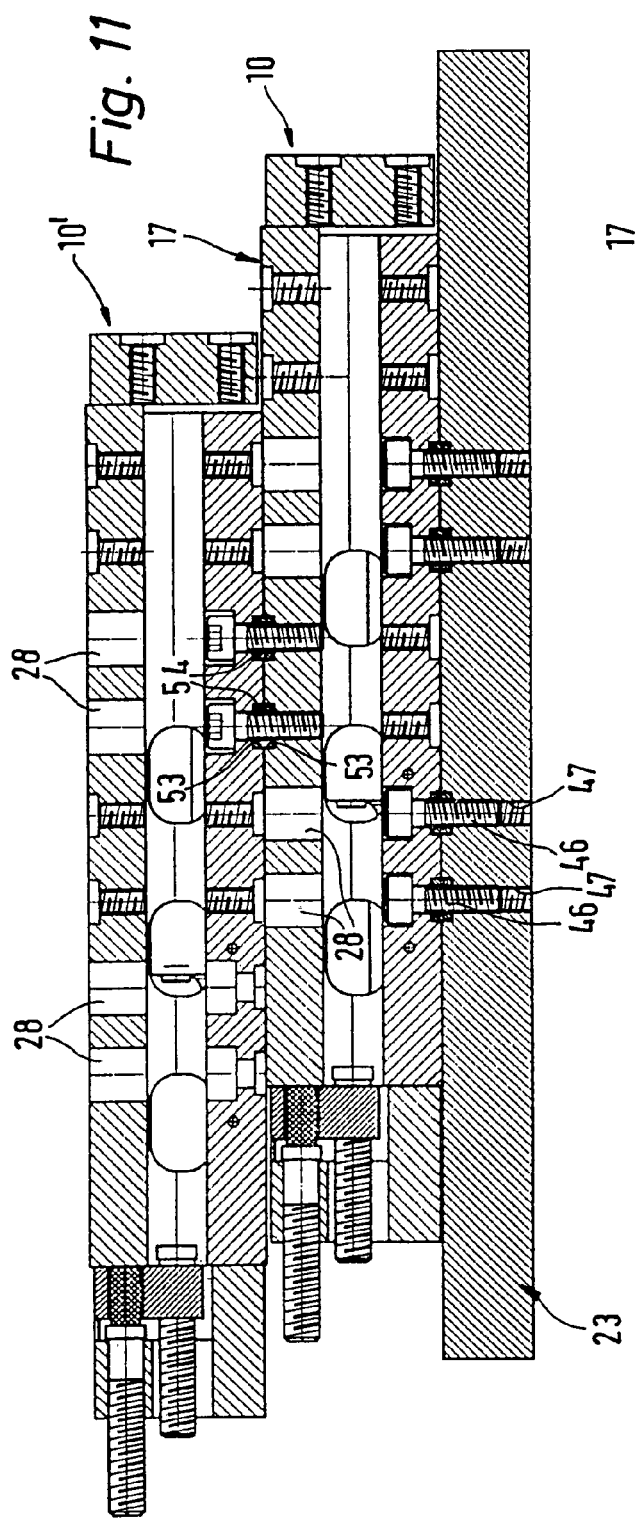
FIGS. 11 through 13 show assembled linear drive subassemblies in different configurations using linked linear drives of the type depicted in FIGS. 9 and 10.
Figure 12:
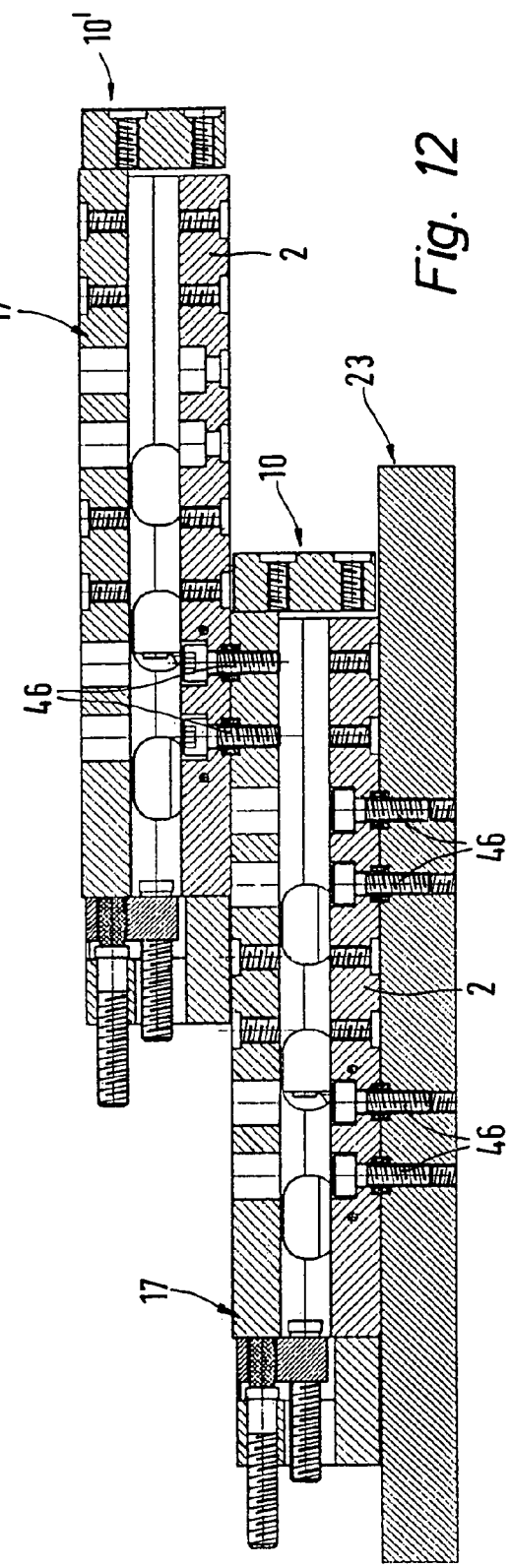

In order to attach a linear drive 10' in accordance with FIGS. 11 and 12 on a carriage 17 piggy-back of another linear drive 10, in accordance with FIGS. 11 and 12 the type of attachment in accordance with FIGS. 11 and 12 is employed, the second carriage openings 29 being used instead of the plate side openings 47 formed as threaded holes so that a direct screw connection is possible.

Again there is here the possibility of attaching the two linear drives 10 and 10' to each other in different relative positions in the direction of the principal axis 1.

In order to produce an accurate alignment during the fitting together of two linear drives 10 and 10' in all working embodiments the second carriage openings 29 may possess respectively one concentric centering widened part 53 on the end side facing away from the drive housing 2 and the second carriage openings 29 may possess respectively one concentric centering widened part 53 at the end side facing away from the carriage 17. In the assembled state of two linear drives 10 and 10' a respective centering sleeve 54 may be inserted into the flush centering widened part 53 of the drive housing 2 and of the carriage 17, such sleeve fitting in an interlocking fashion in the two component so that there is an interlocking attachment perpendicularly to the upright axis 18. The bore of the centering sleeve 54 is so formed that the associated attachment screw may be inserted without threaded engagement.

Preferably at the end face facing axially away from the drive housing 2 of the connecting yoke 22 constituting a head piece of the carriage 17 at least two threaded holes 55 on the head side are provided aligned in the direction of the principal axis, which with a mutual offset lie on a line 56 parallel to the upright axis and whose distance apart measured in the direction of this line 56 is equal to the distance between two first housing openings in the linear drive 10 and 10'. The thread diameter of such threaded holes 55 at the head side is the same as that of the second carriage openings 29. Thus in accordance with FIGS. 9 and 13 a linear drive 10' can be fitted with the bottom side of its drive housing 2 to the fore to the end face of the head piece 22 and then, like the arrangement in FIGS. 5 and 10, screwed by means of two first (34) and two third (45) screws in place. The principal axis of the fitted linear drive 10' then runs parallel to that of the other linear drive 10 so that movements are possible in a x-y coordinate system.

Figure 13:
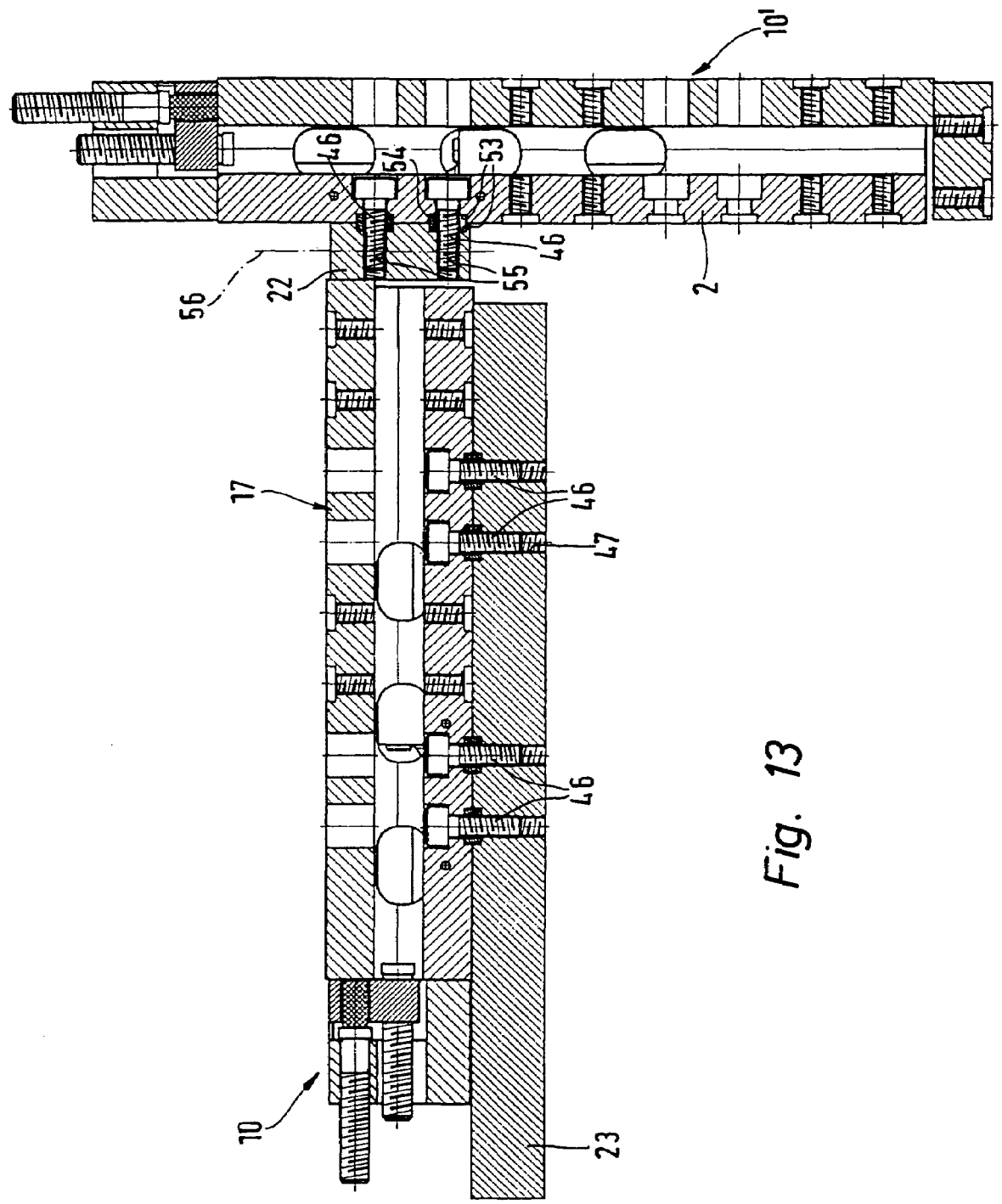

As shown in FIG. 13 in the case of the connection between a linear drive 10' and head piece or connecting yoke 22 as well centering sleeves 54 may be utilized. In this case the head side threaded holes 55 also have a centering widened part 53 in the end part suitable for receiving the centering sleeve 54.

The invention claimed is:

1. A linear drive comprising a drive housing and a carriage guided for movement in the direction of a principal axis, said carriage being arranged with at least a part of its length in the direction of an upright axis adjacent to the drive housing and having at least one linear row of openings with first carriage openings spaced apart in the direction of the principal axis, said drive housing having at least one linear row of openings with first housing openings spaced from each other in the direction of the principal axis, such spaced first housing openings being able to be brought, by suitable positioning of the carriage, into an assembly position flush in the direction of the upright axis with one respective carriage opening so that attachment screws serving for the attachment of the linear drive may be completely inserted through the first carriage openings and inserted into the first housing openings, wherein the row of openings on the carriage comprises, in addition to the first carriage openings, second carriage openings in the form of threaded holes, which render possible the screwing in of attachment screws, which are inserted into the first housing openings through the first carriage openings, of a further similar linear drive mounted with its drive housing to the fore in a piggy-back fashion directly on the carriage, and wherein the first carriage openings and the second carriage openings are linearly aligned in the direction of the principal axis.

2. The linear drive as set forth in claim 1, wherein the first carriage openings are unthreaded.

3. The linear drive as set forth in claim 1, wherein the first and the second carriage openings are respectively arranged in groups in alternating succession.

4. The linear drive as set forth in claim 1, wherein the first and the second carriage openings are respectively arranged in pairs and in alternating succession with each other.

5. The linear drive as set forth in claim 1, wherein in a certain carriage position all first carriage openings are flush with first housing openings.

6. The linear drive as set forth in claim 1, wherein within the row of openings on the housing side at least one group of at least two directly sequential first housing openings is present.

7. The linear drive as set forth in claim 1, wherein at least the row of openings on the carriage side is arranged in the middle of the width in the carriage.

8. The linear drive as set forth in claim 1, wherein the drive housing delimits a longitudinally extending drive space, in which drive means adapted to perform a longitudinal movement are located, which are drivingly coupled with a carriage arranged in a linearly moving manner externally on the drive housing.

9. A linear drive comprising a drive housing and a carriage guided for movement in the direction of a principal axis, said carriage being arranged with at least a part of its length in the direction of an upright axis adjacent to the drive housing and having at least one linear row of openings with first carriage openings spaced apart in the direction of the principal axis, said drive housing having at least one linear row of openings with first housing openings spaced from each other in the direction of the principal axis, such spaced first housing openings being able to be brought, by suitable positioning of the carriage, into an assembly position flush in the direction of the upright axis with one respective carriage opening so that attachment screws serving for the attachment of the linear drive may be completely inserted through the first carriage openings and inserted into the first housing openings, wherein the row of openings on the carriage comprises, in addition to the first carriage openings, second carriage openings in the form of threaded holes, which render possible the screwing in of attachment screws, which are inserted into the first housing openings through the first carriage openings, of a further similar linear drive mounted with its drive housing to the fore in a piggy-back fashion directly on the carriage, and wherein the first housing openings are in the form of threaded holes whose thread diameter is sufficiently is large that the thread shank of a attachment screw may be inserted right through without threaded engagement, the thread diameter of such screw being equal to that of the second carriage openings.

10. A linear drive comprising a drive housing and a carriage guided for movement in the direction of a principal axis, said carriage being arranged with at least a part of its length in the direction of an upright axis adjacent to the drive housing and having at least one linear row of openings with first carriage openings spaced apart in the direction of the principal axis, said drive housing having at least one linear row of openings with first housing openings spaced from each other in the direction of the principal axis, such spaced first housing openings being able to be brought, by suitable positioning of the carriage, into an assembly position flush in the direction of the upright axis with one respective carriage opening so that attachment screws serving for the attachment of the linear drive may be completely inserted through the first carriage openings and inserted into the first housing openings, wherein the row of openings on the carriage comprises, in addition to the first carriage openings, second carriage openings in the form of threaded holes, which render possible the screwing in of attachment screws, which are inserted into the first housing openings through the first carriage openings, of a further similar linear drive mounted with its drive housing to the fore in a piggy-back fashion directly on the carriage, and wherein within the row of openings on the housing side in addition to the first housing openings second housing openings are provided, the second housing openings being in the form of threaded holes, whose thread diameter is the same as that of the second carriage openings and the diameter of the first housing openings is so large that the thread shank of an attachment screw, whose thread diameter is the same as that of the second housing opening, may be inserted without threaded engagement.

11. The linear drive as set forth in claim 10, wherein the first housing openings are unthreaded.

12. A linear drive comprising a drive housing and a carriage guided for movement in the direction of a principal axis, said carriage being arranged with at least a part of its length in the direction of an upright axis adjacent to the drive housing and having at least one linear row of openings with first carriage openings spaced apart in the direction of the principal axis, said drive housing having at least one linear row of openings with first housing openings spaced from each other in the direction of the principal axis, such spaced first housing openings being able to be brought, by suitable positioning of the carriage, into an assembly position flush in the direction of the upright axis with one respective carriage opening so that attachment screws serving for the attachment of the linear drive may be completely inserted through the first carriage openings and inserted into the first housing openings, wherein the row of openings on the carriage comprises, in addition to the first carriage openings, second carriage openings in the form of threaded holes, which render possible the screwing in of attachment screws, which are inserted into the first housing openings through the first carriage openings, of a further similar linear drive mounted with its drive housing to the fore in a piggy-back fashion directly on the carriage, and wherein the carriage possesses a head piece on whose end side at least two threaded holes lying on a line parallel to the upright axis are provided, whose distance apart is the same as the distance apart of two first housing openings and whose thread diameter is the same as that of the second carriage openings more particularly in such a fashion that a further similar linear drive having a perpendicular alignment is able to be screwed on.

13. A linear drive comprising a drive housing and a carriage guided for movement in the direction of a principal axis, said carriage being arranged with at least a part of its length in the direction of an upright axis adjacent to the drive housing and having at least one linear row of openings with first carriage openings spaced apart in the direction of the principal axis, said drive housing having at least one linear row of openings with first housing openings spaced from each other in the direction of the principal axis, such spaced first housing openings being able to be brought, by suitable positioning of the carriage, into an assembly position flush in the direction of the upright axis with one respective carriage opening so that attachment screws serving for the attachment of the linear drive may be completely inserted through the first carriage openings and inserted into the first housing openings, wherein the row of openings on the carriage comprises, in addition to the first carriage openings, second carriage openings in the form of threaded holes, which render possible the screwing in of attachment screws, which are inserted into the first housing openings through the first carriage openings, of a further similar linear drive mounted with its drive housing to the fore in a piggy-back fashion directly on the carriage, and wherein on the end side facing away from the drive housing the second carriage openings respectively possess a concentric centering widening part for the insertion of a centering sleeve and on the end side facing away from the carriage the first housing openings respectively have a concentric centering widened part for the insertion of a centering screw.

14. The linear drive as set forth in claim 13, wherein the second housing openings as well have a concentric centering widening part on the end side facing away from the carriage.

* * * * *

UNITED STATES PATENT AND TRADEMARK OFFICE
CERTIFICATE OF CORRECTION

PATENT NO. : 7,290,477 B2
APPLICATION NO. : 11/054038
DATED : November 6, 2007
INVENTOR(S) : Angue et al.

It is certified that error appears in the above-identified patent and that said Letters Patent is hereby corrected as shown below:

Column 10, line 8, now reads "is sufficiently is large"

should read --is sufficiently large--

Signed and Sealed this

Thirteenth Day of May, 2008

JON W. DUDAS
*Director of the United States Patent and Trademark Office*